United States Patent
Ready et al.

(10) Patent No.: US 11,675,776 B2
(45) Date of Patent: Jun. 13, 2023

(54) REVERSE UPDATE DATA GENERATION

(71) Applicant: Microsoft Technology Licensing, LLC, Redmond, WA (US)

(72) Inventors: Jonathon Tucker Ready, Bozeman, MT (US); Cristian Gelu Petruta, Redmond, WA (US); Mark Zagorski, Redmond, WA (US); Timothy Patrick Conley, Seattle, WA (US); Imran Baig, Redmond, WA (US); Alexey Teterev, Redmond, WA (US); Asish George Varghese, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/361,618

(22) Filed: Jun. 29, 2021

(65) Prior Publication Data
US 2022/0292076 A1    Sep. 15, 2022

Related U.S. Application Data

(60) Provisional application No. 63/160,284, filed on Mar. 12, 2021.

(51) Int. Cl.
  *G06F 16/23* (2019.01)
  *G06F 11/14* (2006.01)
(52) U.S. Cl.
  CPC ...... *G06F 16/2365* (2019.01); *G06F 11/1474* (2013.01); *G06F 2201/80* (2013.01)
(58) Field of Classification Search
  None
  See application file for complete search history.

(56) References Cited

U.S. PATENT DOCUMENTS

| | | | |
|---|---|---|---|
| 8,903,779 B1 | 12/2014 | Holenstein et al. | |
| 10,372,555 B1 | 8/2019 | Troyan et al. | |
| 2009/0164525 A1* | 6/2009 | Krishnaswamy | ... G06F 16/2379 |
| 2015/0149704 A1* | 5/2015 | Lee | ..... G06F 16/2358 711/135 |
| 2018/0060377 A1* | 3/2018 | Kulkarni | ..... G06F 16/2358 |
| 2018/0150490 A1 | 5/2018 | Lipcon | |

FOREIGN PATENT DOCUMENTS

EP    0336548 A2    10/1989

OTHER PUBLICATIONS

Bradley, T. (Mar. 1, 2011). Repair your windows PC with system restore. PCWorld. Retrieved Dec. 27, 2022, from https://www.pcworld.com/article/495323/how_to_repair_your_windows_pc_with_system_restore.html (Year: 2011).*

"International Search Report and Written Opinion Issued in PCT Application No. PCT/US22/018407", dated Jun. 20, 2022, 15 Pages.

* cited by examiner

*Primary Examiner* — Eddy Cheung (57) ABSTRACT

Managing data in a computing device is disclosed, including generating reverse delta updates during an apply operation of a forward delta update. A method includes operations of applying forward update data to an original data object to generate an updated data object from the original data object and generating, during the applying, reverse update data, the reverse update data configured to reverse effects of the forward update data and restore the original data object from the updated data object.

20 Claims, 7 Drawing Sheets

REVERSE UPDATE DATA GENERATION

CROSS-REFERENCE TO RELATED APPLICATIONS

The present application claims benefit of priority to U.S. Provisional Patent Application No. 63/160,284, entitled "REVERSE UPDATE DATA GENERATION" and filed on Mar. 12, 2021, which is specifically incorporated by reference for all that it discloses and teaches.

BACKGROUND

A computer in its regular use often receives data updates from the cloud. In an implementation, the data update is meant to apply to at least one specific data object in the computer. The data update includes forward update data used to effectuate a forward update on an original data object. The forward update data includes data to be inserted in the original data object and instructions for deleting, inserting, and/or replacing existing data in the original data object to make an updated data object. Reversing this update can be cumbersome and compute-intensive.

SUMMARY

The described technology provides implementations of systems and methods for data object restoration. More specifically, the described technology provides implementations of systems and methods for reversing data updates.

A method of managing data in a computing device is disclosed. The method includes operations of applying forward update data to an original data object to generate an updated data object from the original data object and generating, during the applying, reverse update data, the reverse update data configured to reverse effects of the forward update data and restore the original data object from the updated data object.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTIONS

Systems and methods for restoring an original data object from an updated data object are disclosed. A data object is a discrete collection of data elements that form a discrete conceptual unit and can be retrieved and/or operated upon. Data objects may include data constructs, for example, one or more of variables, functions, data structures, tables, columns, and classes. Data objects may be stored in contiguous physical memory locations or may be referenced by referencing elements pointing to different locations in memory in which the data elements are stored. Data objects may contain instructional program code and/or non-instructional data (collectively referred to as "data"). Data objects may be updated individually or collectively, perhaps in a system update and/or by direct user modification.

Reversing an update of a data object can be a difficult and computationally expensive task in conventional systems. For example, restoring an original data object to which a forward data update has been applied may require that both the updated and original versions of the data object be stored. It may also require that the updated data object itself store some of the changes made and a subsequent computationally expensive operation to determine how to carry out reverse operations to restore the prior data object. Also, if data is removed from a data object during an update, the deleted data may be permanently deleted from local computer device storage. Retrieving the deleted data may require a new download and/or installation of the original data object to restore the original data object after a forward update. The original data object may not be available at the time, perhaps hampering crucial computer functionality. Further, in systems where both forward and reverse update data are stored and transmitted, unnecessary compute, storage, and network resources may be occupied.

In accordance with the presently described technology, during a forward update, using the forward update data, a reverse update generator can substantially simultaneously create reverse update data configured to reverse the effects of the forward update data on the original data object. The reverse update data contains reverse instructions (relative to the forward update instructions) and also contains any data that is deleted from the original data object during the forward update. The reverse update data may also contain instructions to delete any data that is inserted during the forward update. Reverse update data that contains mostly instructions and data changed from a data object during a forward update may be 20-100 times smaller than the original data object, saving storage while still conferring reverse update functionality. Additionally, instead of a compute-intensive interpretation of reverse operations during a reverse update, the present reverse update data provides a direct road map to restoring the original data object from the updated data object. Generating reverse update data as a forward update applied to an original data object may save storage space, memory, and processing power and reserve compute infrastructure after a potentially flawed and/or otherwise irreversible forward update is applied.

Figure 1:
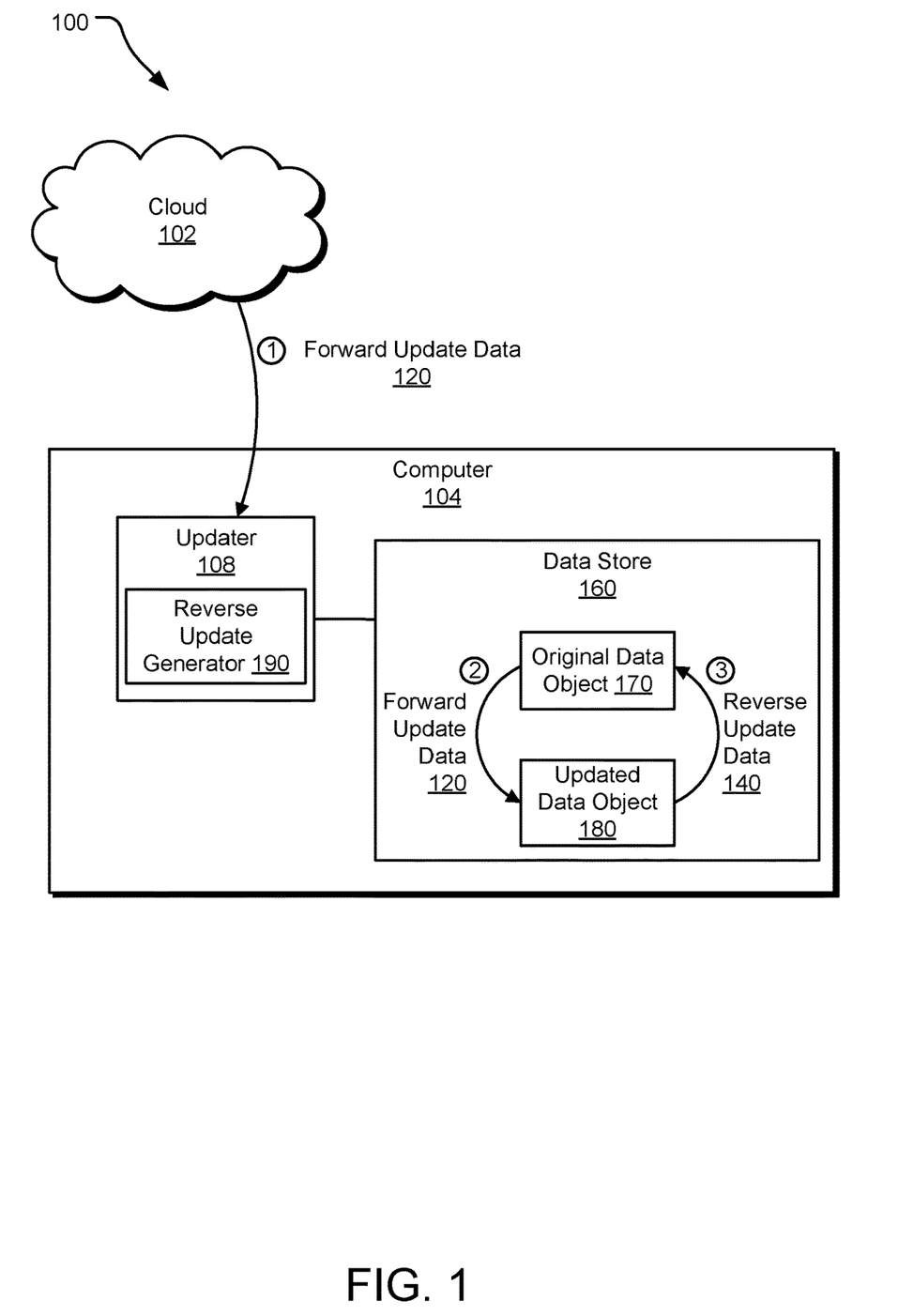
FIG. 1 illustrates an example system for restoring an updated data object to an original data object.

FIG. 1 illustrates an example system 100 for restoring an updated data object to an original data object. The implementation of system 100 includes a cloud system 102, a computer system 104, an updater 108, a reverse update generator 190, and a data store 160. The datastore 160 may store one or more of the forward update data 120, reverse update data 140, an original data object 170, and an updated data object 180. Arrows 1, 2, and 3 are shown and represent transmission and/or use of data.

The cloud system 102 is a processor and memory system able to receive, store, process, and transmit data. The computer system 104 is a processor and memory system capable of transmitting, receiving, storing, and processing data. The computer system 104 is communicatively coupled to the cloud system 102. In an implementation, forward update data 120 is transmitted from the cloud system 102 to the computer system 104, the transmission represented in the figure by arrow 1. An updater in the computer system 104 receives the forward update data 120. The computer system 104 includes a processor and memory system configured to execute programs, including the updater 108 and the reverse update generator 190, and stores data including one or more of the forward update data 120, reverse update data 140, original data object 170, and updated data object 180 in a datastore 160 in memory.

The updater 108 is a program that can modify data in data objects. The original data object 170 is a data object that has yet to be manipulated in a forward update or which has previously been restored from a prior reverse data update. The updated data object 180 is a data object that results from manipulating the original data object 170 in a forward update. As can be seen in FIG. 1, the updater 108 can use the forward update data 120 to effectuate a forward update that generates the updated data object 180 from the original data object 170, as can be seen at arrow 2. The updater 108 can effectuate a reverse update using the reverse update data 140 to restore the original data object 170 from the updated data object 180, as can be seen at arrow 3.

In various implementations, the computer system 104 includes a reverse update generator. The reverse update generator 190 is a routine that tracks forward update instructions and data and creates corresponding reverse update instructions and data as forward updates are applied in order to generate reverse update data 140. The reverse update data 140 is data used to effectuate a reverse update on the updated data object 180. This reverse update data 140 may include reversed instructions relative to the forward update data 120 and may also include data deleted from the original data object 170 during the forward update. The reverse update data 140 may be stored in a discrete data object, such as a file or non-file binary. For instance, the data may be a non-file binary abstraction without a discrete file identity. The file or non-file binary may be dedicated to reverse update data for the purpose of reversing a specific forward update applied to an original data object. Example data objects may include without limitation binary and/or non-binary databases and registries, BLOBs (Binary Large OBjects), and non-file binary abstractions.

The reverse update data 140 may also include various data associations, for instance, associations among one or more of the original data object 170, the updated data object 180, the updater 108, the reverse update generator 190, and the forward update data 120. The reverse update data 140 may also include version data of one or more of the original data object 170 and the updated data object 180, and/or aggregated version or release data associated with a broader update that encompasses the forward update data 120. For instance, a general update release may be applied that contains incremental data elements, perhaps specific to particular data objects, and each incremental data update element may be associated with its own identifier relative to the overall release or package identifier. Examples of release or version identifier levels may include one or more of operating system major version, operating system minor version, package major version, and package minor version. The associations and/or version data may be contained in an identifier, for instance, a header, filename, directory address, pointer, or the like of the reverse update data 140. Data for storing referenceable association and/or version data may include implementation-specific structure. For example, in one implementation, the association and/or version data is or is a part of an extensible markup language (XML) file that specifies metadata that references the relative directory address and filename or other descriptor or label of the forward update data 120 and/or the reverse update data 140. In implementations, a hierarchical data file (e.g., a JSON or XML file) may be used to specify how a system to be updated with forward update data 120 or reverse update data 140 may utilize the collection of forward update data 120 or reverse update data 140 in a particular general update release.

While FIG. 1 depicts the datastore 160 as containing the forward update data 120, the reverse update data 140, the original data object 170, and the updated data object 180, the datastore 160 may only contain some of these elements at any given time. For instance, during a forward update, the original data object 170 may be manipulated with or without maintaining a buffered copy of the original data object 170. That is, implementations are contemplated in which, during a forward update, the original data object 170 is manipulated and becomes the updated data object 180. Upon completion of the forward update, the forward update data 120 and the original data object 170 may be superfluous for operation and may be deleted. The updated data object 180 may be stored at the same time as the reverse update data 140.

Also, in implementations where the reverse update data 140 is generated by the reverse update generator 190 during a forward update, there may be no reverse update data 140 in the datastore 160 before the forward update. After the forward update, the datastore 160 may store both the reverse update data 140 and the updated data object 180 but neither the forward update data 120 nor the original data object 170. After the updater 108 has effectuated a reverse update, the datastore 160 may store the original data object 170 but none of the forward update data 120, the reverse update data 140, or the updated data object 180. Further, the reverse update data 140 may be deleted if a subsequent forward update is applied to the updated data object 180. Alternatively, the reverse update data 140 may track changes and generate reverse data over a number of updates and may provide reversibility to any forward update in the history of the forward updates applied to the original data object 170. The datastore 160, as illustrated in FIG. 1, shows an example relationship and sequence and does not necessarily represent that which is stored in the datastore 160 at any particular time.

It should also be appreciated that, while the computer and storage are demonstrated as a single system in FIG. 1, distributed systems with one or more of distributed processing and distributed memory are contemplated. For instance, some or all of the data disclosed herein might be stored and/or processed in multiple memory devices of a single computing device, in a distributed and/or networked system of computing devices or servers, in edge devices and communicatively coupled cloud servers, in a distributed manner between communicatively coupled one or more of client devices, edge servers/devices, and cloud servers/devices/services. The data and packages disclosed herein may be addressable and distributed in any manner among computing devices, whether commonly owned, whether consistently communicatively coupled, intermittently or periodically communicatively coupled, or the like.

The updater 108 executes instructions represented by data in the forward update data 120 (e.g., forward update instructions) and/or the reverse update data 140 (e.g., reverse update instructions). The instructions may include one or more of insertions, deletions, replacements, reordering, shifting, other data manipulations (e.g., multiplies, adds, allocations), and the like. More complicated instructions are contemplated, including compiler level instructions, the reverse of which are not necessarily simple opposites (e.g., not necessarily as simple as a forward delete and corresponding reverse insert). The data the updater 108 operates on may include one or more of data that is stored in the original data object 170, data that is stored in the updated data object 180, data that is provided by the forward update data 120, and/or data that is provided/restored by the reverse update data 140. The data may be written, deleted, or replaced at any level, for instance, one or more of a bit level, a byte level, an object level, a file level, and the like. Data stored in the forward update data 120 to be inserted into the original data object 170 may be considered added data. Data stored in the reverse update data 140 to be inserted (or reinserted from the perspective of the original data object 170) into the updated data object 180 may be considered restorative data.

An example instruction of the reverse update generator 190 may include tracking and inverting changes during a forward update to an RTM binary. For instance, when the updater 108, in a forward update, inserts bytes of added data from forward update data 120 into an original data object 170 RTM binary (to form the updated data object 180 RTM binary), the reverse update generator 190 saves a start address of the inserted data, a size of the inserted data, and a delete command in the reverse update data 140. When this reverse instruction is executed, it will remove the data that was inserted into the RTM binary by the updater 108 in the forward update. Another example may include a reverse instruction for a delete operation. The updater 108 may, in a forward update, delete bytes from an RTM binary according to data in the forward update data 120. The reverse update generator 190 may save the start address, size, and data (e.g., restorative data) of the byte or other data increment that was deleted in the forward update to the reverse update data 140. When this reverse instruction is executed, the data that was deleted in the forward update is restored to make the original data object 170.

The instructions in the reverse update data 140 may be the effective reverse of the instructions in the forward update data 120 and may also be configured to be executed in reverse order. That is, the reverse instruction of the first operation of the forward update data 120 may be the last instruction configured to be executed in the reverse update data 140. Correspondingly, the reverse instruction of the last operation to be executed of the forward update data 120 may be the first instruction of the reverse update data 140 to be executed. Executing reverse update instructions in the opposite sequence of the corresponding forward update instructions may help assure that the addresses to which data is written and from which data is removed are consistent at the time the instructions are executed. Other implementations are contemplated where such ordering is unnecessary, for instance, when the data locations/addresses operated on by different operations in the reverse and forward updates do not affect one another.

The updater 108 may also execute operations and updates in a compiler mode. For instance, a compiler mode update may be optimized for execution by the compiler to efficiently render the update. Compiler-level instructions may be more complex than fundamental instructions such that an effective reverse instruction does not translate one-to-one to a fundamental instruction reversal of a forward instruction. While an example updater 108 is disclosed, it should be appreciated that the components, subcomponents, operations, and suboperations may be characterized differently or analogously. For instance, a compiler optimization conducted with respect to forward update data 120 or reverse update data 140 may include address translation. This specialized transform operation may be reversed in a reverse update through a binary disassembly, then address translation, and then reassembly.

Figure 2:
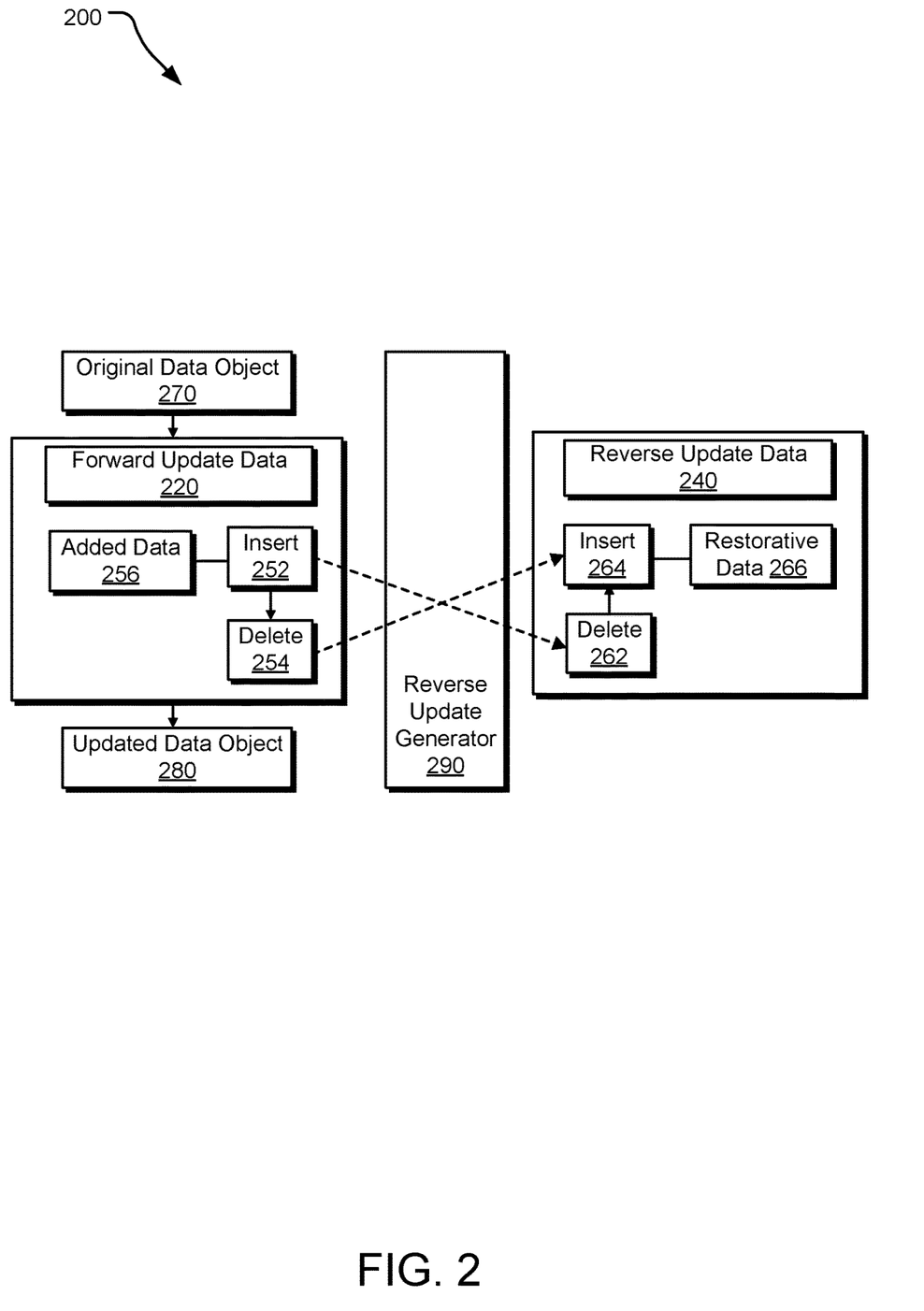
FIG. 2 illustrates an example system for generating reverse update data.

FIG. 2 illustrates an example system 200 for generating reverse update data. The implementation of system 200 includes an original data object 270, an updated data object 280, forward update data 220, a forward insert instruction 252 with associated added data 256, a forward delete instruction 254, a reverse update generator 290, a reverse delete instruction 262, and a reverse insert instruction 264 with associated restorative data 266. Dashed arrows are shown to demonstrate corresponding structures and relative orders of instructions in each of the forward update data 220 and the reverse update data 240.

In this implementation, forward update data 220 is being applied by an updater to an original data object 270 to form an updated data object 280. The forward update data 220 includes a forward insert instruction 252 with associated added data 256 and a forward delete instruction 254. When the forward insert instruction 252 is executed, added data 256 is inserted into the original data object 270 to begin to form the updated data object 280. In parallel (or substantially in parallel or substantially concurrently), the reverse update generator 290 stores a corresponding reverse delete instruction 262 in the reverse update data 240. The reverse delete instruction 262 may be stored with information indicating that it should be executed in a reverse order from the forward insert instruction 252, relative to other instructions. After the forward insert instruction 252 is executed and the added data 256 is added to the original data object 270, the updater proceeds to the next instruction, the forward delete instruction 254. The forward delete instruction 254 may cause the updater to delete an element from the already modified original data object 270. In parallel, the reverse update generator 290 may generate a corresponding reverse insert instruction 264 with the associated deleted restorative data 266 that was, is, or will be deleted by executing the forward delete instruction 254. The reverse insert instruction 264 is conducted in a reverse order relative to the forward delete instruction 254.

In implementations, any data to be deleted from the original data object 270 in a forward update may be buffered or may be saved directly to the reverse update data 240 before deletion from the original data object 270. When the term "in parallel" is used herein, it can mean one or more of concurrently, while, simultaneously, during, contemporaneously, instantly before, substantially near to the time, just before, immediately before, and the like. For instance, the reverse update generator 290 may read an instruction from the forward update data 220 and may, in advance of execution of the instruction from the forward update data 220, determine whether data from the original data object 270 is to be deleted and to save the data to be deleted as restorative data in the reverse update data 240. Further, the reverse update generator 290 may generate a reverse update instruction corresponding to a loaded forward update instruction, the reverse update instruction to be stored in the reverse update data 240 before, during, or after the forward instruction is executed. In another implementation, the original data object 270 may be buffered during the forward update, such that the reverse update generator 290 may provide flexibility in the execution of the reverse instructions, allowing portions of data that would be deleted from the original data object 170 during a forward update to be stored in reverse update data 240 even after the original data from the original data object 270 is deleted in the forward update. This implementation may allow a reverse update generator 290 flexibility in the timing of generation of the reverse update data 240 relative to the timing of execution of corresponding forward update data 220, perhaps even allowing restorative data 266 to be saved after the data has been deleted from the instance of the original data object 270 to which the forward update is applied.

As demonstrated by the dashed and crossed arrows, the forward insert instruction 252 corresponds with the reverse delete instruction 262, and the forward delete instruction 254 corresponds with the reverse insert instruction 264. The corresponding forward and reverse instructions are shown as being executable in opposite orders. This may reduce the likelihood that data is incorrectly overwritten if relative addresses of data are affected by sequential steps. The reverse update generator 290 may operate on an instruction-by-instruction basis, updating the reverse update data 240 with each instruction to be executed from the forward update data 220. In a different implementation, the reverse update generator 290 may be a number of steps ahead of the updater in executing the forward update.

Figure 3:
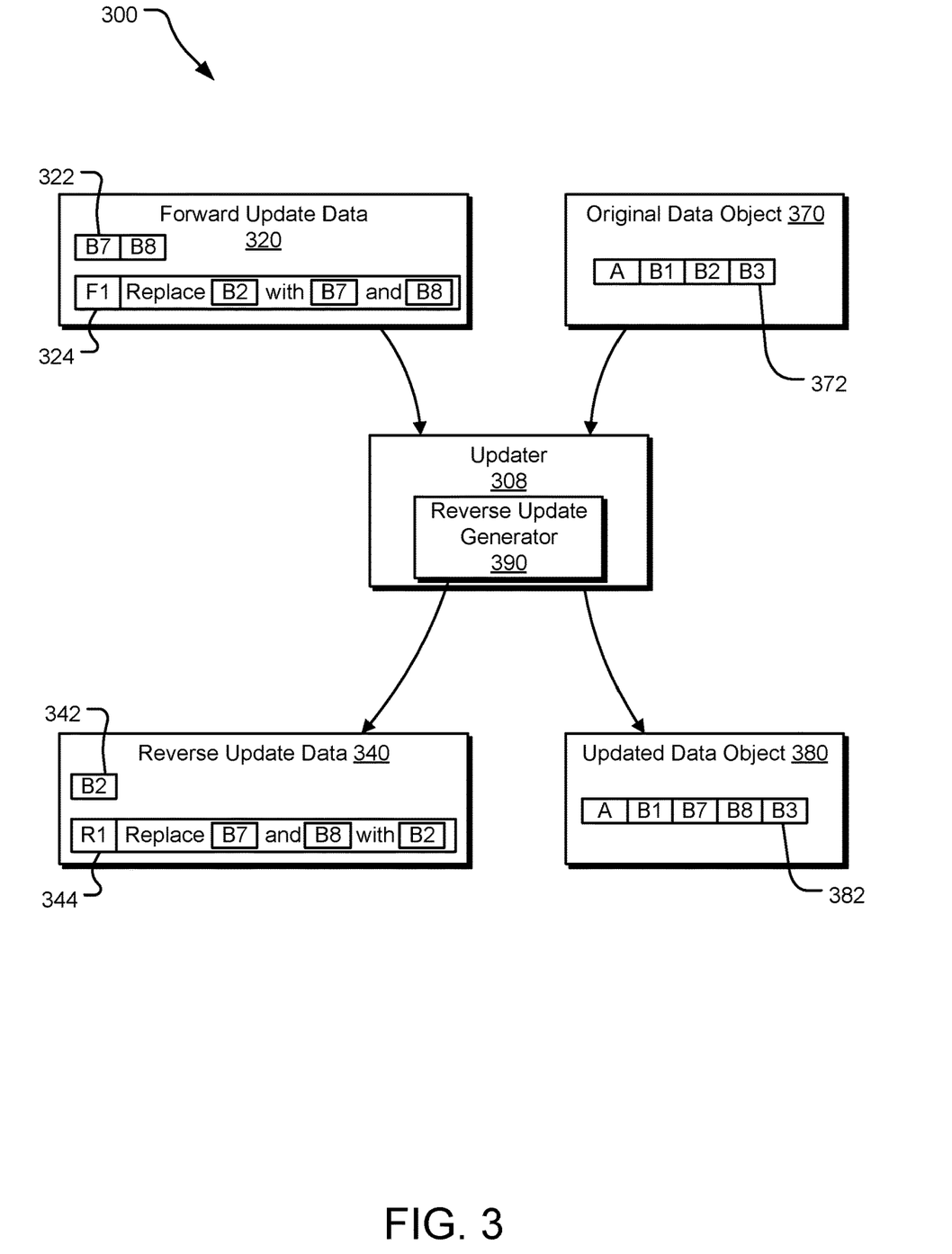
FIG. 3 illustrates another example system for generating reverse update data.

FIG. 3 illustrates another example system 300 for generating reverse update data. The implementation of system 300 includes an updater 308, a reverse update generator 390, forward update data 320 including added data 322 and a forward update instruction 324, an original data object 370 including a data sequence 372, reverse update data 340 including restorative data 342 and a reverse update instruction 344, and an updated data object 380 including an updated data sequence 382.

During a forward update, the updater 308 may apply the forward update data to the original data object 370. The original data object 370 includes a data sequence 372, presented as the sequence A, B1, B2, B3. The forward update data 320 includes a forward update instruction, labeled as F1, to replace the B2 element of the data sequence 372 with the added data 322, representing sequential elements B7 and B8. Before, while, or after the updater 308 executes the forward update instruction 324, the reverse update generator 390 generates reverse update data 340 corresponding to the forward update data 320. The reverse update instruction 344 corresponds to and is the reverse of the forward update instruction 324. As can be seen, the reverse update instruction 344 is to replace B7 and B8 of the added data 322 in the updated data object 380 with the restorative data 342, B2, the restorative data 342 being the corresponding data that was replaced during the forward update of the original data object 370. The updater 308 applies the forward update data 320 to the original data object 370 to generate the updated data object 380. After the forward update instruction 324 is applied, the updated data object 380 includes the updated data sequence 382, represented as a sequence A, B1, B7, B8, B3.

This system allows for a near contemporaneous generation of reverse update data with the application of the forward update data 320 to the original data object 370. It can be appreciated that, if more than one forward instruction were presented, the reverse update generator 390 may present corresponding reverse instructions to be applied in an order reversed from the corresponding forward instructions. This may allow for loading forward update data once for both the purpose of effectuating the forward update and generating reverse update data 140. While the instruction presented for illustrative purposes is a replace instruction, the replace instruction can comprise more fundamental instructions, for instance, one or more of insertions, deletions, and shifts. In those instances, each fundamental instruction step may need to be reversed and placed in reversed order relative to the corresponding forward update steps in the reverse update data with any intermediate deleted data from the original data object 370 being saved to the reverse update data 340 as restorative data 342.

Figure 4:
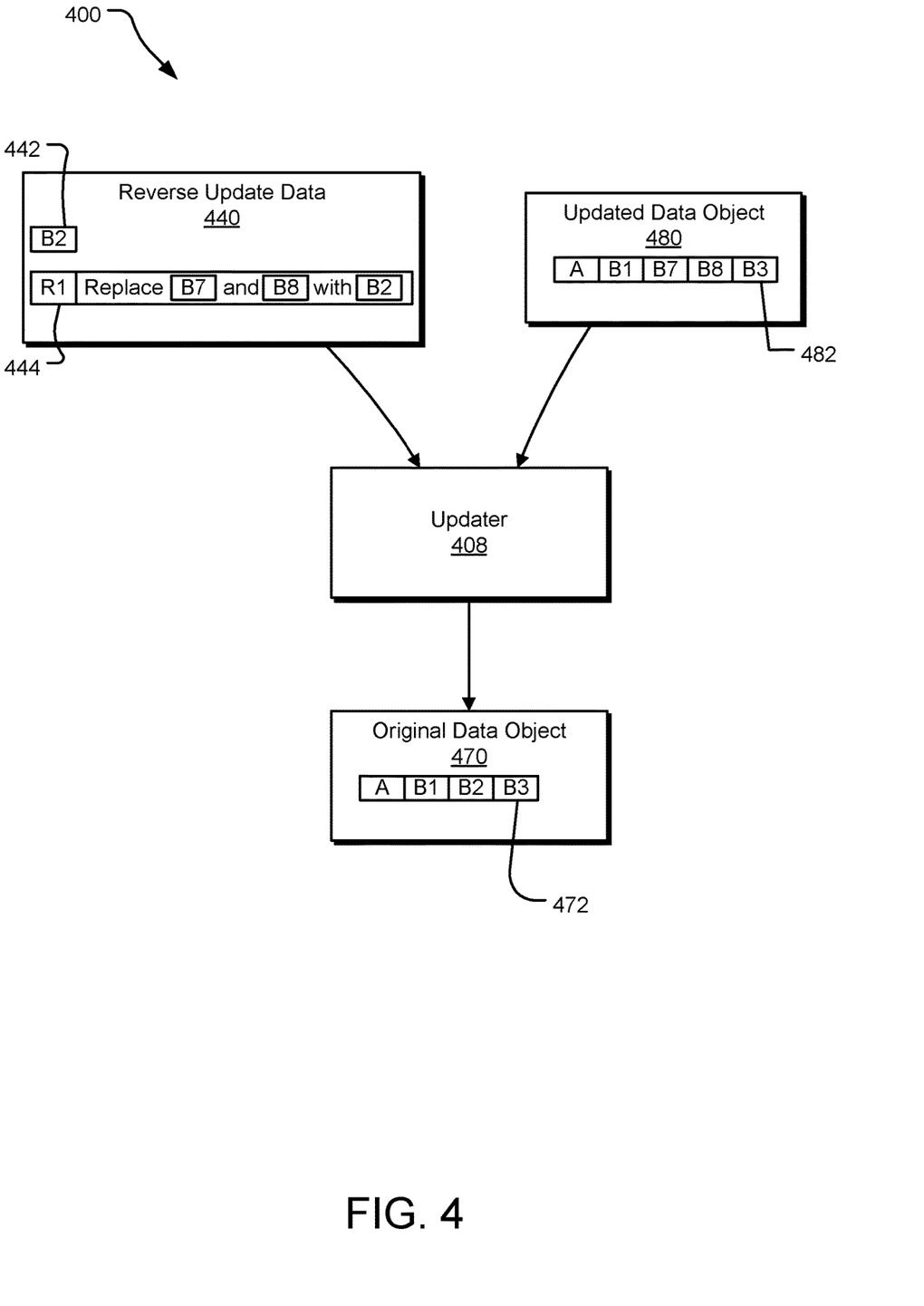
FIG. 4 illustrates an example system for restoring an updated data object to an original data object.

FIG. 4 illustrates an example system 400 for restoring an updated data object to an original data object. The implementation of the system 400 includes an updater 408, reverse update data 440 including restorative data 442 and a reverse update instruction 444, an updated data object 480 including an updated data sequence 482, and an original data object 470 including a data sequence 472.

The updater 408 applies the reverse update data 440 to the updated data object 480 to generate the original data object 470. This may involve applying a reverse update instruction 444 to the updated data object 480 to remove forward update data from the updated data object 480 and insert restorative data 442 into the updated data object. In this implementation, reverse update instruction 444, labeled as R1, instructs the updater 408 to replace B7 and B8 of the updated data sequence 482 with B2 of the restorative data 442. The updated data sequence 482 in this implementation is A, B1, B7, B8, B3. The resulting original data object 470 includes the data sequence 472 of A, B1, B2, B3. The reverse update instruction 444 and other reverse update instructions that are stored in the reverse update data 440 may be effective reversals and conducted in reverse order of corresponding forward update instructions previously applied to the original data object 470 that existed before the updater 408 applied the forward update to the original data object 470 to make the updated data object 480. While the instruction presented is a replace instruction, the replace instruction can comprise more fundamental operations, for instance, one or more of insertions, deletions, transforms, and shifts. More complicated instructions are contemplated, for instance, compiler level instructions, for which an effective reverse instruction does not translate one-to-one to a fundamental instruction reversal of a forward instruction.

Figure 5:
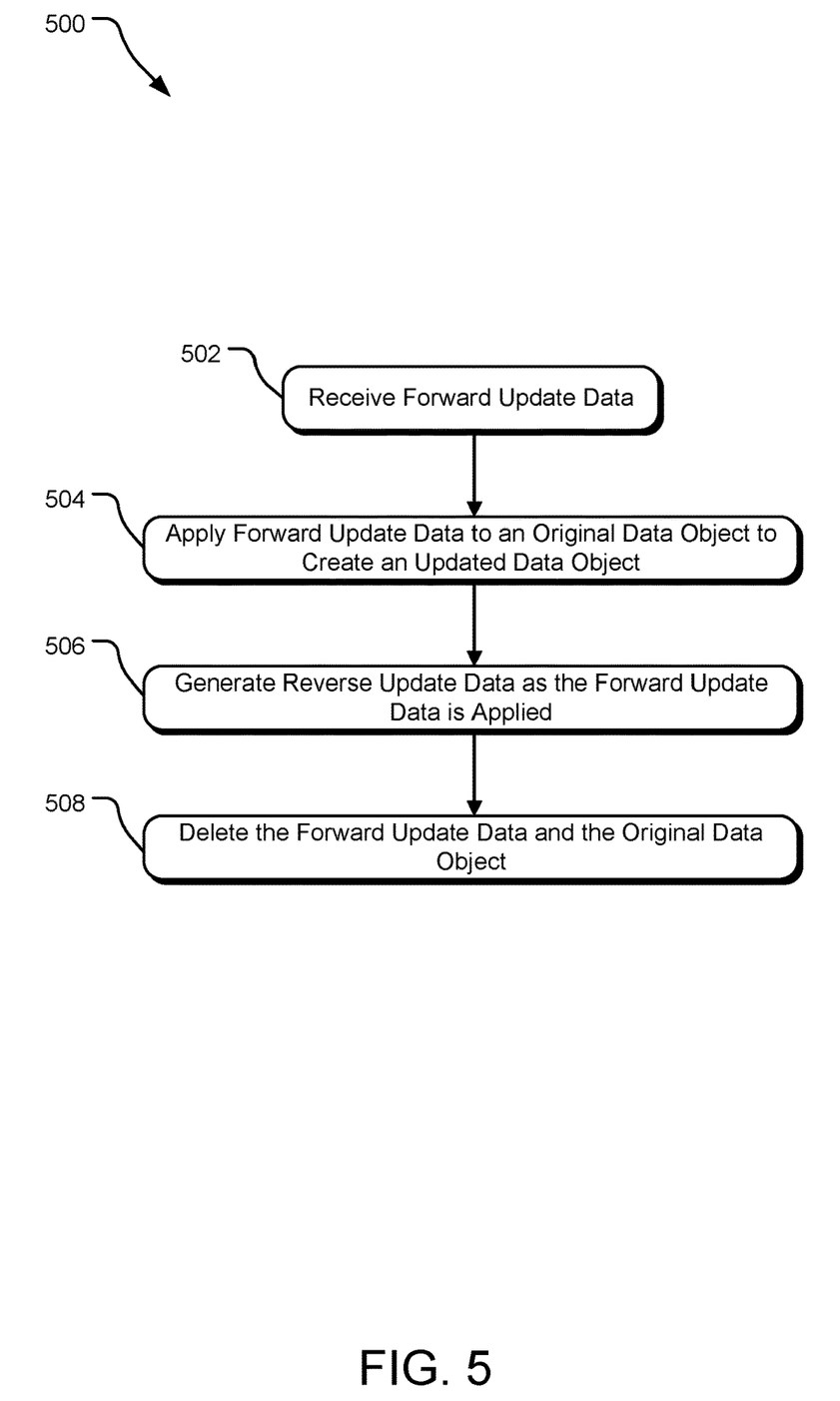
FIG. 5 illustrates a flowchart of example operations for generating reverse update data.

FIG. 5 illustrates a flowchart of example operations 500 for generating reverse update data. Receiving operation 502 receives forward update data. In an implementation, a computing device may receive forward update data from a network, for instance, a cloud network. The forward update data may contain instructions to apply a forward update to an original data object.

Applying operation 504 applies a forward update to an original data object to create an updated data object. The computer system may include an updater that updates data objects. The updater may apply the forward update to the original data object in order to generate the updated data object. The forward update data may include one or more instructions, for instance, one or more of deletion, insertion, shifting, replacement, reordering, and other data manipulation (e.g., multiplies, adds, allocations) instructions.

Generating operation 506 generates reverse update data while the forward update data is applied by applying operation 504. In an implementation, as the updater is effectuating the forward update using the forward update data, a reverse update generator generates corresponding reverse update data capable of reversing the effects of the corresponding forward update. The reverse update data may include any data that is deleted from the original data object, as well as instructions to reverse the effects of a forward update.

The instructions contained in the reverse update data may be the reverse of instructions executed from the forward upload data. The reverse instructions in the reverse update data may be configured to be applied in reverse order relative to the corresponding forward update instructions. This may be to appropriately undo instructions and data manipulations executed from the forward update data. The reverse ordering may help if instructions to be executed earlier from the forward update data were consequential relative to instructions to be executed later from the forward update data (and, correspondingly, if reverse instructions executed earlier may be consequential to reverse instructions to be executed later).

The operation of generating reverse update data as the forward update data is applied may occur during a forward update and may be done in parallel with the forward update. When the term "in parallel" is used herein, it can mean one or more of simultaneously, during, while, contemporaneously, instantly before, sequentially, substantially near to the time, just before, immediately before, and the like. For instance, the reverse update generator may read an instruction from the forward update data and may, in advance of execution of the instruction from the forward update data, determine whether data from the original data object is to be deleted and to save the data to be deleted as restorative data in the reverse update data. Further, the reverse update generator may generate a reverse update instruction corresponding to a loaded forward update instruction, the reverse update instruction to be stored in the reverse update data before, during, or after the forward instruction is executed.

The reverse update data may be written by the reverse update generator to a specific discrete data object, such as a file. The reverse update generator may store associating data in the reverse update data to associate the reverse update data with data objects. For example, the associating data may be configured to associate the reverse update data with one or more of the forward update data, the original data object, and the updated data object. The associating data may be included as an element of a reverse update data object identifier, for instance, a header, filename, directory address, pointer, or the like of the reverse update data. The reverse update generator may also write version data to the reverse update data. The version data may include version data of one or more of the original data object and the updated data object, and/or aggregated version or release data associated with a broader update that includes the forward update data. The associations and/or version data may be contained in one or more of an identifier, a header, filename, directory address, pointer, and the like of the reverse update data.

Further, the reverse update data may be deleted if a subsequent forward update is applied to the updated data object. Alternatively, the reverse update data may track changes and generate reverse data over a number of updates and may provide reversibility to any forward update in the history of forward updates applied to the original data object.

Deleting operation 508 deletes the forward update data and the original data object. The reverse update data generated in generating operation 506 may provide a complete instruction set and accompanying object data to reconstruct the original data object from the updated data object in a reverse update. This may render the forward update data and the original data object superfluous, unnecessarily occupying storage space and, perhaps, (volatile) memory. With the updated data object and the reverse update data stored, the forward update data and the original data object may be deleted, freeing the aforementioned storage space and/or memory, without risking future access to the original data object. In an implementation, the operation 508 may be omitted from the operations 500. For example, the forward update data may continue to be stored for future use on the computer system, perhaps to restore the updated data object in a subsequent forward update after a reverse update is applied.

Figure 6:
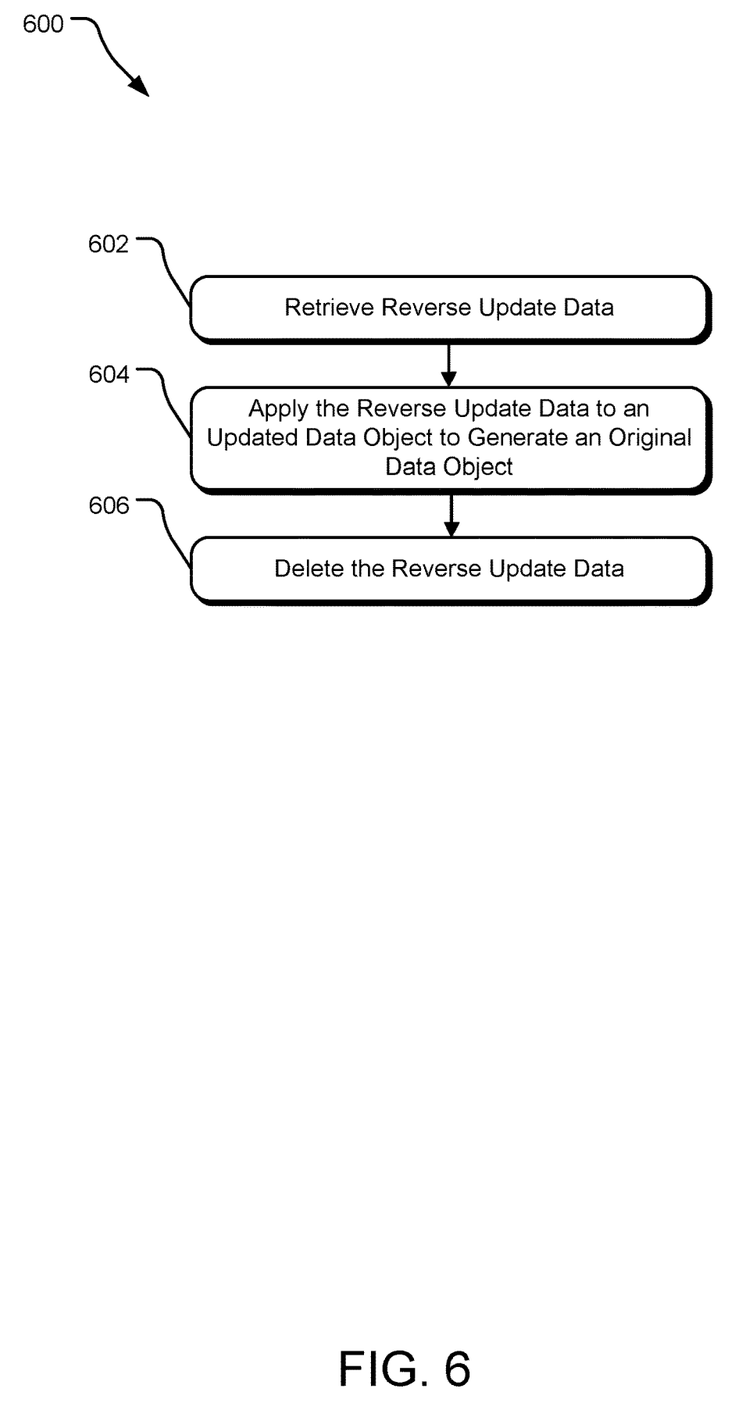
FIG. 6 illustrates a flowchart of example operations for applying reverse update data.

FIG. 6 shows a flowchart of example operations 600 for applying reverse update data. Retrieving operation 602 retrieves reverse update data from memory in a computing device. Retrieving operation 602 may use associative data to identify reverse update data associated with a previously updated data object.

Applying operation 604 applies the reverse update data to the previously updated data object to generate an original data object. The reverse update data may contain reverse update instructions and restorative data. The reverse update data may be applied by an updater in a reverse update to reverse any operations conducted in a forward update. For instance, the reverse update data may be applied to delete any added data from the updated data object. The reverse update data may be applied to restore restorative data that was removed from the original data object in the forward update. The reverse update instructions in the reverse update data may be executed in an order opposite the order in which corresponding forward update instructions were executed during the forward update and may be opposite in nature from the corresponding forward update instructions (e.g., a delete is the opposite of an insert).

Delete operation 606 deletes the reverse update data. Once the reverse update is completed, the reverse update data may be superfluous. As such, the reverse update data may be removed without consequence. In implementations, delete operation 606 may be omitted. For example, the reverse update data may continue to be stored for future use on the computer system, perhaps to restore the original data object again in a subsequent reverse update after a forward update is applied.

Figure 7:
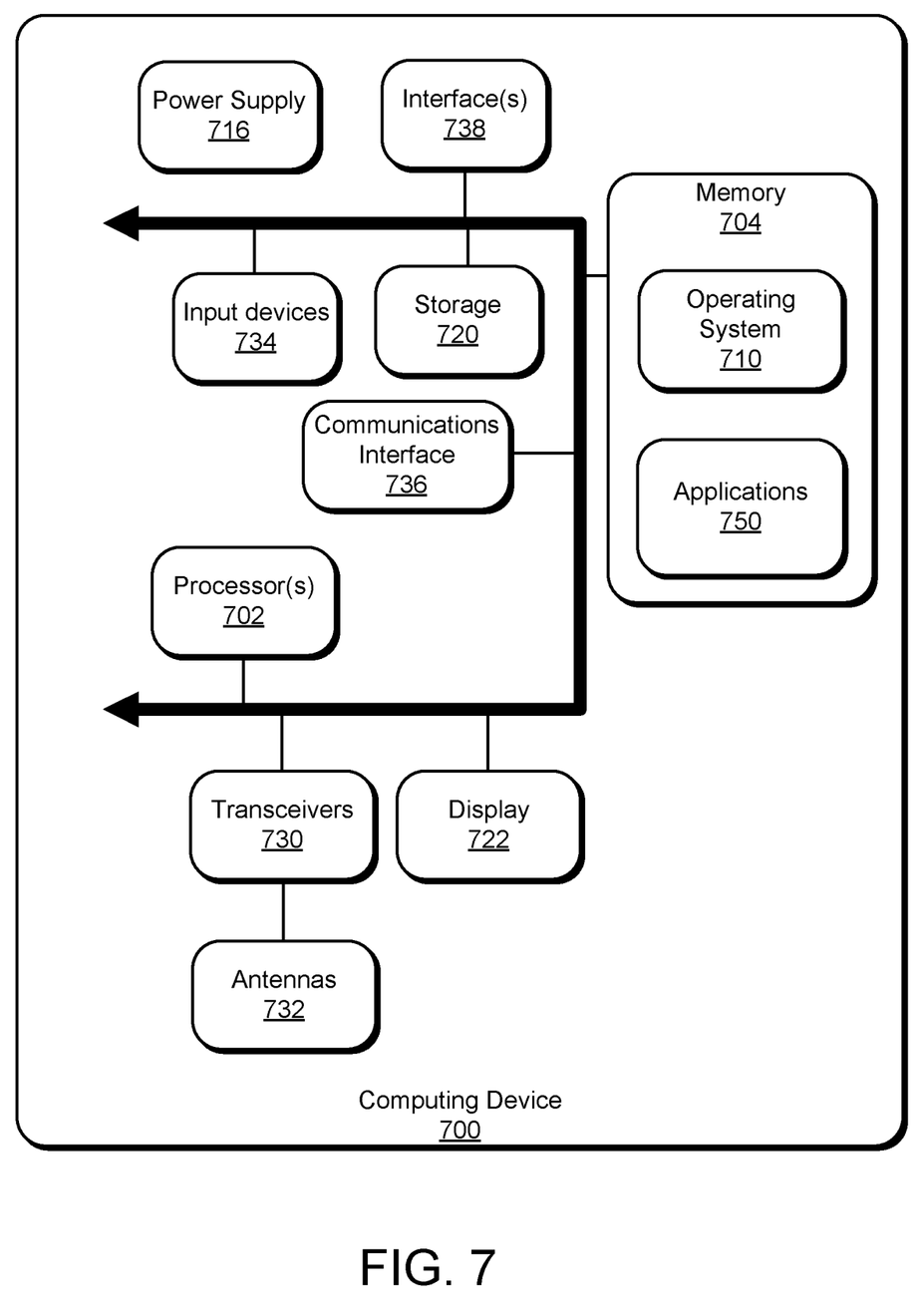
FIG. 7 illustrates an example computing device for implementing the features and operations of the described technology.

FIG. 7 illustrates an example computing device 700 for implementing the features and operations of the described technology. The computing device 700 may embody a remote-control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 700 includes one or more processor(s) 702 and a memory 704. The memory 704 generally includes both volatile memory (e.g., RAM) and nonvolatile memory (e.g., flash memory). An operating system 710 resides in the memory 704 and is executed by the processor(s) 702.

In an example computing device 700, as shown in FIG. 7, one or more modules or segments, such as applications 750, an updater, a reverse update generator, a forward update instruction, a reverse update instruction, a forward delete instruction, a forward insert instruction, a reverse delete instruction, a reverse insert instruction, a replacement instruction, workloads, and modules, are loaded into the operating system 710 on the memory 704 and/or storage 720 and executed by processor(s) 702. The storage 720 may include one or more tangible storage media devices and may store forward update data, reverse update data, an original data object, an updated data object, an RTM binary, added data, restorative data, data sequences, updated data sequences, locally and globally unique identifiers, requests, responses, and other data and be local to the computing device 700 or may be remote and communicatively connected to the computing device 700.

The computing device 700 includes a power supply 716, which is powered by one or more batteries or other power sources and which provides power to other components of the computing device 700. The power supply 716 may also be connected to an external power source that overrides or recharges the built-in batteries or other power sources.

The computing device 700 may include one or more communication transceivers 730, which may be connected to one or more antenna(s) 732 to provide network connectivity (e.g., mobile phone network, Wi-Fi®, Bluetooth®) to one or more other servers and/or client devices (e.g., mobile devices, desktop computers, or laptop computers). The computing device 700 may further include a network adapter 736, which is a type of computing device. The computing device 700 may use the adapter and any other types of computing devices for establishing connections over a wide-area network (WAN) or local-area network (LAN). It should be appreciated that the network connections shown are examples and that other computing devices and means for establishing a communications link between the computing device 700 and other devices may be used.

The computing device 700 may include one or more input devices 734 such that a user may enter commands and information (e.g., a keyboard or mouse). These and other input devices may be coupled to the server by one or more interfaces 738, such as a serial port interface, parallel port, or universal serial bus (USB). The computing device 700 may further include a display 722, such as a touch screen display.

The computing device 700 may include a variety of tangible processor-readable storage media and intangible processor-readable communication signals. Tangible processor-readable storage can be embodied by any available media that can be accessed by the computing device 700 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 700. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal with one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physical controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

An example method of managing data in a computing device is provided. The method includes operations of applying forward update data to an original data object to generate an updated data object from the original data object, and generating, during the applying, reverse update data, the reverse update data configured to reverse effects of the forward update data and restore the original data object from the updated data object.

Another example method of any preceding method is provided, wherein the reverse update data includes one or more of reverse update instructions and restorative data, the restorative data configured to be inserted into the updated data object during a reverse update, the reverse update instructions and restorative data configured to execute the reverse update.

Another example method of any preceding method is provided, wherein the forward update data includes added data and forward update instructions, the added data configured to be inserted into the original data object concurrent with the operation of applying the forward update data, the forward update instructions, and the added data used to execute the operation of applying the forward update data.

Another example method of any preceding method is provided, wherein each of the reverse update instructions corresponds to a corresponding forward update instruction and is configured to reverse an effect of the corresponding forward update instruction.

Another example method of any preceding method is provided, wherein the reverse update instructions are configured to execute in a reverse order relative to an order of execution of corresponding forward update instructions.

Another example method of any preceding method is provided, wherein each element of the restorative data represents data deleted from the original data object during the forward update, the deletion based on at least one of the forward update instructions.

Another example method of any preceding method is provided, wherein a delete instruction of the reverse update instructions is configured to delete an element contributed from the added data to the original data object.

Another example method of any preceding method is provided, wherein the reverse update data includes version data, the version data including one or more identifiers identifying one or more of the original data object, the updated data object, the forward update data, and general update release data.

Another example method of any preceding method is provided, further including an operation of storing the reverse update data and deleting the forward update data.

Another example method of any preceding method is provided, further including an operation of applying the reverse update data to the updated data object to restore the original data object.

An example system for managing data of a computer system is provided. The computer system includes one or more processors and at one least one memory device, the at least one memory device communicatively coupled to the one or more processors, the one or more processors configured to execute commands using data stored on the at least one memory device, the at least one memory device including an updater executable by the one or more processors and configured to apply forward update data to an original data object to generate an updated data object from the original data object and a reverse update generator executable by the one or more processors and configured to generate, substantially concurrently with the application of the forward update data by the updater, reverse update data, the reverse update data configured to reverse effects of the forward update data and restore the original data object from the updated data object, wherein the reverse update data includes one or more of reverse update instructions and restorative data.

Another example system of any preceding system is provided, wherein the reverse update data is stored in a discrete file in the at least one memory device, the discrete file only storing reverse update data for restoring the original data object from the updated data object.

Another example system of any preceding system is provided, wherein the restorative data is configured to be inserted into the updated data object during the reverse update, the reverse update instructions and restorative data used to execute the reverse update, and wherein the forward update data includes added data and forward update instructions, the added data configured to be inserted into the original data object concurrent with the forward updater applying a forward update, the forward update instructions and the added data configured to execute the forward update.

Another example system of any preceding system is provided, wherein each of the reverse update instructions corresponds to a corresponding forward update instruction and is configured to reverse an effect of the corresponding forward update instruction and wherein the reverse update instructions are configured to execute in a reverse order relative to an order of execution of the corresponding forward update instructions.

Another example system of any preceding system is provided, wherein each element of the restorative data represents data deleted from the original data object during the forward update, the deletion based on at least one of the forward update instructions.

One or more example tangible processor-readable storage media devices encoding processor-executable instructions for executing on an electronic computing device a process of managing data is provided. The process includes applying forward update data to an original data object to generate an updated data object from the original data object and generating, during the applying, reverse update data, the reverse update data configured to reverse effects of the forward update data.

One or more other example tangible processor-readable storage media devices of any preceding media device, wherein the reverse update data includes one or more of reverse update instructions and restorative data, the restorative data configured to be inserted into the updated data object during the reverse update, the reverse update instructions and restorative data used to execute the reverse update, and wherein the forward update data includes added data and forward update instructions, the added data configured to be inserted into the original data object during the forward update, the forward update instructions and the added data used to execute the forward update.

One or more other example tangible processor-readable storage media devices of any preceding media device, wherein the reverse update instructions are configured to execute in a reverse order relative to corresponding forward update instructions.

One or more other example tangible processor-readable storage media devices of any preceding media device, wherein each of the reverse update instructions corresponds to a forward update instruction and is a reverse of the corresponding forward update instruction, and wherein each element of the restorative data represents data deleted from the original data object during the operation of applying the forward update data, the deletion based on at least one of the forward update instructions.

One or more other example tangible processor-readable storage media devices of any preceding media device, wherein the reverse update data includes version data, the version data including one or more identifiers identifying one or more of the original data object, the updated data object, the forward update data, and general update release data.

An example system for managing data in a computing device is provided. The system includes means for applying forward update data to an original data object to generate an updated data object from the original data object and means for generating, during the application of the forward update data, reverse update data, the reverse update data configured to reverse effects of the forward update data and restore the original data object from the updated data object.

Another example system of any preceding example system is provided, wherein the reverse update data includes one or more of reverse update instructions and restorative data, the restorative data configured to be inserted into the updated data object during a reverse update, the reverse update instructions and restorative data configured to execute the reverse update.

Another example system of any preceding example system is provided, wherein the forward update data includes added data and forward update instructions, the added data configured to be inserted into the original data object concurrent with the application of the forward update data, the forward update instructions and the added data configured to execute the application of the forward update data.

Another example system of any preceding example system is provided, wherein each of the reverse update instructions corresponds to a corresponding forward update instruction and is configured to reverse an effect of the corresponding forward update instruction.

Another example system of any preceding example system is provided, wherein the reverse update instructions are configured to execute in a reverse order relative to an order of execution of corresponding forward update instructions.

Another example system of any preceding example system is provided, wherein each element of the restorative data represents data deleted from the original data object during the forward update, the deletion based on at least one of the forward update instructions.

Another example system of any preceding example system, wherein a delete instruction of the reverse update instructions is configured to delete an element contributed from the added data to the original data object.

Another example system of any preceding example system is provided, wherein the reverse update data includes version data, the version data including one or more identifiers configured to identify one or more of the original data object, the updated data object, the forward update data, and general update release data.

Another example method of any preceding example method is provided, further including means for storing the reverse update data and means for deleting the forward update data.

Another example method of any preceding example method is provided, further including means for applying the reverse update data to the updated data object to restore the original data object.

While this specification contains many specific implementation details, these should not be construed as limitations on the scope of any inventions or of what may be claimed, but rather as descriptions of features specific to particular embodiments of particular described technology. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A method of managing data in a computing device, comprising:
   receiving, by the computing device from a network, an operating system update release including forward update data containing instructions to apply a forward update to an original data object;
   applying, by the computing device, the forward update data to the original data object to generate an updated data object from the original data object; and
   generating, by the computing device during the applying, reverse update data, the reverse update data including reverse update instructions configured to reverse effects of the forward update data and restore the original data object from the updated data object.

2. The method of claim 1, wherein the reverse update data further includes restorative data, the restorative data configured to be inserted into the updated data object during a reverse update, the reverse update instructions and restorative data configured to execute the reverse update.

3. The method of claim 2, wherein the forward update data includes added data and forward update instructions, the added data configured to be inserted into the original data object concurrent with the operation of applying the forward update data, the forward update instructions, and the added data configured to execute the operation of applying the forward update data.

4. The method of claim 3, wherein each of the reverse update instructions corresponds to a corresponding forward update instruction and is configured to reverse an effect of the corresponding forward update instruction.

5. The method of claim 3, wherein the reverse update instructions are configured to execute in a reverse order relative to an order of execution of corresponding forward update instructions.

6. The method of claim 3, wherein each element of the restorative data represents data deleted from the original data object during the forward update, the deletion based on at least one of the forward update instructions.

7. The method of claim 3, wherein a delete instruction of the reverse update instructions is configured to delete an element contributed from the added data to the original data object.

8. The method of claim 1, wherein the reverse update data includes version data, the version data including one or more identifiers identifying one or more of the original data object, the updated data object, the forward update data, and general update release data.

9. The method of claim 1 further comprising:
   storing the reverse update data; and
   deleting the forward update data.

10. The method of claim 1 further comprising:
    applying the reverse update data to the updated data object to restore the original data object.

11. A system for managing data of a computer system including one or more processors and at one least one memory device, the at least one memory device communicatively coupled to the one or more processors, the one or more processors configured to execute commands using data stored on the memory device, the memory device comprising:
  a forward updater executable by the one or more processors and configured to:
    receive an operating system update release, from a network, including forward update data containing a forward update instruction to modify data in an original data object;
    apply the forward update data to the original data object to generate an updated data object from the original data object, wherein applying the forward update includes loading the forward update instruction; and
  a local reverse update generator executable by the one or more processors and configured to generate, while the forward update instruction is loaded, reverse update data, the reverse update data configured to reverse effects of the forward update data and restore the original data object from the updated data object, wherein generating the reverse update data includes:
    generating a reverse update instruction based on the loaded instruction; and
    generating restorative data corresponding to the data to be modified by the forward update instruction.

12. The system of claim 11, wherein the reverse update data including the reverse update instruction and the forward update instruction, is stored in a discrete file in the at least one memory device, the discrete file only storing reverse update data for restoring the original data object from the updated data object.

13. The system of claim 11, wherein the restorative data is configured to be inserted into the updated data object during the reverse update, the reverse update instructions and restorative data used to execute the reverse update, and wherein the forward update data includes added data and forward update instructions, the added data configured to be inserted into the original data object concurrent with the forward updater applying a forward update, the forward update instructions and the added data configured to execute the forward update.

14. The system of claim 13, wherein each of the reverse update instructions corresponds to a corresponding forward update instruction and is configured to reverse an effect of the corresponding forward update instruction and wherein the reverse update instructions are configured to execute in a reverse order relative to an order of execution of the corresponding forward update instructions.

15. The system of claim 13, the reverse update instruction and the restorative data are generated prior to the data in the original data object is modified.

16. One or more tangible processor-readable storage media devices encoding processor-executable instructions for executing on an electronic computing device a process of managing data, the process comprising:
  receiving, from a network by the electronic computing device, a system update including a forward update data containing instructions to apply a forward update to an original data object;
  applying the forward update data to an original data object to generate an updated data object from the original data object; and
  generating, by the electronic computing device during the applying, reverse update data, the reverse update data including reverse update instructions configured to reverse effects of the forward update data.

17. The one or more tangible processor-readable storage media devices of claim 16, wherein the reverse update data further includes restorative data, the restorative data configured to be inserted into the updated data object during the reverse update, the reverse update instructions and restorative data used to execute the reverse update, and wherein the forward update data includes added data and forward update instructions, the added data configured to be inserted into the original data object during the forward update, the forward update instructions and the added data used to execute the forward update.

18. The one or more tangible processor-readable storage media devices of claim 16, wherein the reverse update instructions are configured to execute in a reverse order relative to corresponding forward update instructions.

19. The one or more tangible processor-readable storage media devices of claim 17, wherein each of the reverse update instructions corresponds to a forward update instruction and is a reverse of the corresponding forward update instruction, and wherein each element of the restorative data represents data deleted from the original data object during the operation of applying the forward update data, the deletion based on at least one of the forward update instructions.

20. The one or more tangible processor-readable storage media devices of claim 16, wherein the reverse update data includes version data, the version data including one or more identifiers identifying one or more of the original data object, the updated data object, the forward update data, and general update release data.

* * * * *